(12) United States Patent
Kusunose

(10) Patent No.: US 8,069,008 B2
(45) Date of Patent: Nov. 29, 2011

(54) DEPTH MEASUREMENT APPARATUS AND DEPTH MEASUREMENT METHOD

(75) Inventor: Haruhiko Kusunose, Kanagawa (JP)

(73) Assignee: Lasertec Corporation, Kanagawa (JP)

( * ) Notice: Subject to any disclaimer, the term of this patent is extended or adjusted under 35 U.S.C. 154(b) by 695 days.

(21) Appl. No.: 12/218,745

(22) Filed: Jul. 17, 2008

(65) Prior Publication Data

US 2009/0187378 A1 Jul. 23, 2009

(30) Foreign Application Priority Data

Jul. 31, 2007 (JP) .................................. 2007-199346

(51) Int. Cl.
*G06F 15/00* (2006.01)
(52) U.S. Cl. ....................................................... 702/166
(58) Field of Classification Search .................. 702/166; 356/503
See application file for complete search history.

(56) References Cited

U.S. PATENT DOCUMENTS 7,403,289 B2 * 7/2008 de Groot ....................... 356/503

FOREIGN PATENT DOCUMENTS

JP   2001-0066122   3/2001

* cited by examiner

*Primary Examiner* — Drew A Dunn
*Assistant Examiner* — Xiuquin Sun
(74) *Attorney, Agent, or Firm* — Carrier Blackman & Associates, P.C.; Joseph P. Carrier; William D. Blackman

(57) ABSTRACT

A via hole depth measurement apparatus generates a light beam of white light, divides the light beam into a measurement and reference beams, focuses the measurement beam and projects it onto a sample, reflects the reference beam and advances it along the original optical path, continuously changes a relative optical path length difference between optical path lengths of the measurement and reference beams, combining reflected light from the sample and from the reflected reference beam and generates an interference beam, changes a relative distance between an objective lens which focuses the measurement beam and the sample, detects a relative position between the objective lens and the sample, receives the interference beam and outputs an interference signal, and, and outputs recessed portion depth information based on displacement information based on the interference signal and the relative position between the objective lens and the sample.

11 Claims, 4 Drawing Sheets

DEPTH MEASUREMENT APPARATUS AND DEPTH MEASUREMENT METHOD

BACKGROUND OF THE INVENTION

1. Field of the Invention

The present invention relates to a depth measurement apparatus for measuring the depth of a recessed portion such as a hole or a step, and more particularly relates to a depth measurement apparatus and a depth measurement method capable of measuring the depth of the hole having high aspect ratio with high resolution.

The present invention relates to a depth measurement apparatus for outputting 2-dimensional image information of a sample surface and depth information of the recess formed on the sample surface.

2. Description of the Related Art

With miniaturization of semiconductor devices, an aspect ratio of a recessed portion such as a via hole formed on a semiconductor wafer is higher greatly, it is strongly demanded to develop a depth measurement apparatus capable of measuring the depth of a fine via hole with high resolution. For example, with respect to the semiconductor devices currently developed, it is required to measure a via hole in a silicon substrate having a diameter of 30 µm and a depth of 100 µm with resolution of 0.1 µm. As a method of measuring the depth of such the fine recessed portion, it is considered to use a light beam for measurement. However, in the case of measuring the hole depth having a high aspect ratio, an objective lens with high NA cannot be used. Therefore, the depth of the fine hole cannot be measured using the features of confocal optical system. In addition, some via holes do not have an etching stopper formed on the bottom surface and some via holes are formed by laser processing. Such via holes do not have a flat bottom surface and thus the reflected light from the bottom surface of the recessed portion is weak. In fact, the reflected light from the bottom surface cannot be accurately measured.

As a surface profile measurement apparatus for measuring a sample surface profile, there has been known an apparatus which projects an illumination light emitted from a white light source through an objective lens onto a sample surface, captures images of an interference stripe formed by an interference of a reference light and a measurement light by a CCD camera, and measures the sample surface profile (for example, see Japanese Patent Laid-Open No. 2001-66122). According to the known surface profile measurement apparatus, an optical path length difference continuously changing is introduced between an optical path length of the reference light and an optical path length of the measurement light, a large number of images of the interference pattern are captured, and a characteristic function having a peak position matching with a peak position of the interference light is estimated. Then, the sample surface profile is measured based on the height of the peak position of the characteristic function.

What is needed is to develop a depth measurement apparatus capable of measuring the depth of a fine via hole having a high aspect ratio with high resolution, but in fact, no practical apparatus has not been developed yet. For that reason, in order to know the depth of the via hole, the silicon wafer is broken to measure the depth of the via hole. According to the surface profile measurement apparatus of the above Japanese Patent Laid-Open No. 2001-66122, the surface profile is measured from an interference pattern formed by the interference between the reference light and the measurement light, and thus, measurement with a high resolution is expected thereon. In fact, it is possible to measure the sample surface profile, but it is extremely difficult to measure the depth of the fine via hole having a high aspect ratio.

It is an object of the present invention to provide a depth measurement apparatus and a depth measurement method capable of measuring the depth of the via hole having a high aspect ratio with high resolution.

SUMMARY OF THE INVENTION

A depth measurement apparatus in accordance with the present invention, in which a light beam is projected onto a sample in which a recess such as a hole or a step is formed, and reflected light from the sample is detected by light detecting means to measure the depth of the recess, the depth measurement apparatus comprising:

means for producing a light beam of white light;

a beam splitter for dividing the light beam into a measurement beam and a reference beam;

an objective lens for focusing the measurement beam and projecting it onto the sample;

a reference mirror for reflecting the reference beam and advancing it along an original optical path;

fringe scanning means for continuously changing a relative optical path length difference between an optical path length of the measurement beam and an optical path length of the reference beam;

beam combining means for combining the reflected light from the sample and the reflected light from the reference mirror to produce an interference beam;

a drive mechanism for changing a relative distance between the objective lens and the sample; position detecting means for detecting a relative position between the objective lens and the sample;

light detecting means for receiving the interference beam to output an interference signal; and signal processing means for outputting the depth information of the recess based on displacement information calculated with the interference signal outputted from the light detecting means and relative position information outputted from the position detecting means.

The depth measurement apparatus in accordance with the present invention is based on the following technical considerations. Firstly, when fringe scanning is performed where the focusing point (focal point) of a measurement beam is positioned near the bottom surface of a recessed portion such as a hole or step, an interference signal (fringe scan signal), i.e., interference waveform based on white interference between the reference beam and the measurement beam is detected. Therefore, even if the reflected light from the bottom surface of the recessed portion is weak, the bottom surface of the recess can be detected by detecting the interference signal. Secondly, the interference signal obtained by performing fringe scanning in a state where the focusing point of the measurement beam is positioned on or near the sample surface and the interference signal obtained by performing fringe scanning in a state where the focusing point of the measurement beam is positioned near the bottom surface of the recessed portion are different in amplitude, but have a strong correlation therebetween. Therefore, it is possible to detect an accurate bottom surface position by obtaining a cross correlation function between a first interference signal obtained by performing fringe scanning in a state where the focusing point of the measurement beam is positioned on the sample surface and a second interference signal obtained by performing fringe scanning in a state where the focusing point of the measurement beam is positioned near the bottom surface of the recess and calculating the amount of displacement at the peak.

According to another aspect of the present invention, a depth measurement apparatus has a sample observation mode for outputting 2-dimensional image information of a sample surface and a depth measurement mode for outputting recessed portion depth information such as a hole or step formed on the sample surface; the depth measurement apparatus comprising:

a white light source for generating white illumination light;
a first slit having an elongate opening portion extending in a first direction, receiving the illumination light and emitting a line shaped illumination beam extending in the first direction;
a vibrating mirror which, in the sample observation mode, deflects the line shaped illumination beam in a direction perpendicular to its extending direction and, in the depth measurement mode, is remained stationary;
a second slit which has an elongate opening portion extending in a direction perpendicular to the first direction and, in the depth measurement mode, is selectively disposed in an optical path;
an objective lens for focusing the light beam emitted from the vibrating mirror to project it onto the sample surface;
a line sensor which has a plurality of light receiving elements arranged in a direction corresponding to the first direction and receives the reflected light from the sample surface through the objective lens and the vibrating mirror;
a beam splitter arranged in the optical path between the vibrating mirror and the objective lens and for dividing the light beam emitted from the vibrating mirror into a measurement beam and a reference beam;
a reference mirror for reflecting the reference beam to advances it along the original optical path; fringe scanning means for continuously changing a relative optical path length difference between an optical path length of the measurement beam and an optical path length of the reference beam;
beam combining means for combining the reflected light from the sample and the reflected light from the reference mirror to form an interference beam;
a drive mechanism for changing a relative distance between the objective lens and the sample; position detecting means for detecting a relative position between the objective lens and the sample; and
signal processing means which, in the sample observation mode, outputs 2-dimensional image information of the sample surface based on an output signal from the line sensor, and, in the depth measurement mode, outputs the depth information of the recess based on displacement information calculated with an interference signal outputted from the line sensor and the relative position information outputted from the position detecting means.

According to the present invention, it is possible to output 2-dimensional image information and depth information about the recess using a single confocal optical system. As a result, the recessed portion to be measured and its address are detected by observing the sample surface based on the 2-dimensional image information, and then the depth of the detected recess can be measured without removing the sample from the stage. In addition, according to the invention, the second slit having an opening extending in a direction perpendicular to the opening of the first slit producing a line shaped illumination beam is disposed in the optical path. Therefore, in the depth measurement mode, a spot shaped illumination beam can be projected inside the recessed portion using the same illumination light source as used in the sample observation mode as well as almost complete confocal optical system can be configured. As a result, flare is greatly reduced. Thus, even if the reflected light from the bottom surface of the recessed portion has a weak intensity, the depth can be measured further accurately.

According to a preferred embodiment of the depth measurement apparatus in accordance with the invention, the signal processing means has means for detecting an interference signal from an output signal of the light detecting means or the line sensor as well as means for calculating the amount of displacement at the peak of the cross correlation function between the first interference signal generated by performing fringe scanning in a state where the focal point of the measurement beam is positioned on or near the sample surface near the recessed portion and the second interference signal generated by performing fringe scanning in a state where the focal point of the measurement beam is positioned near the bottom surface of the recessed portion, and determines the recessed portion depth based on the amount of displacement at the peak of the cross correlation function and the relative position information between the objective lens and the sample detected by the position detecting means.

According to another preferred embodiment of the depth measurement apparatus in accordance with the present invention, a beam splitter, an objective lens, and a reference mirror are fixedly disposed on a Z stage; the drive mechanism is configured to move the Z stage in an optical axis direction of the objective lens; and the means for detecting the relative position between the objective lens and the sample is configured to detect the position in an optical axis direction of the Z stage. According to the present embodiment, the objective lens can be moved simply by moving the Z stage in an optical axis direction, and thus, the relative position between the sample and the focal point of the measurement beam can be detected by detecting the position of the Z stage.

According to yet another preferred embodiment of the depth measurement apparatus in accordance with the present invention, the signal processing means calculates an amount of displacement of the objective lens based on the position information of the Z stage when the first interference signal is outputted and the position information of the Z stage when the second fringe scan signal is outputted; and determines the recessed portion depth based on the sum of the obtained displacement amount and the calculated displacement at the peak of the cross correlation function.

According to yet another preferred embodiment of the depth measurement apparatus in accordance with the present invention, the light detecting means and the line sensor use a light detecting means and a line sensor having a charge storage effect where an amount of charges accumulated by receiving incident light corresponds to the receiving time; and the integration time of the light detecting means or the line sensor when the second interference signal is detected is set to be longer than the integration time when the first interference signal is detected. The present embodiment uses the charge storage effect of the light detecting means such as the line sensor in order to solve the problem in that the reflected light from the bottom surface of the recessed portion is weak and noisy. The light detecting means such as the line sensor has the charge storage effect where the amount of charges accumulated by receiving incident light corresponds to the receiving time. Therefore, when fringe scanning is performed near the bottom surface of a recessed portion, an electronic shutter of the line sensor is controlled such that the charge storage time, i.e., integration time of the line sensor, is set to be further longer. When a longer integration time is set to the line sensor, the signal component of the reflected light will have higher intensity. Accordingly, the interference signal can be detected more accurately, and the amount of displacement of the cross correlation function can be detected more accurately. It should be noted that if the control of the electronic shutter of the line sensor is not enough, the fringe scanning speed may be slowed so as to provide a longer integration time.

A depth measurement method in accordance with the present invention, in which a light beam is projected onto a recessed portion such as a hole and an irregular portion existing on a sample surface, a reflected light from the recessed portion is received by light detecting means, and the depth of the recessed portion is measured, the depth measurement method comprising:

a step of positioning a focal point of a measurement beam on or near the sample surface near the recessed portion subject to depth measurement, performing fringe scanning, and outputting a first interference signal;

a step of positioning the sample so that the measurement beam goes inside the recessed portion;

a step of displacing the focal point of the measurement beam from the sample surface near to the bottom surface of the recessed portion, detecting the amount of displacement, performing fringe scanning and outputting a second interference signal;

a step of calculating an amount of displacement at a peak of a cross correlation function between the first interference signal and the second interference signal; and a step of determining the depth of the recessed portion based on the amount of displacement of the focal point of the measurement beam and the amount of displacement obtained from the cross correlation function.

According to a preferred embodiment of the depth measurement method in accordance with the present invention, in the step of displacing the focal point of the measurement beam in a direction of the depth of the recessed portion, the step of displacing the objective lens for projecting the measurement beam to the recessed portion by a predetermined pitch in the optical axis direction to perform fringe scanning is repeated until an interference signal having a correlation to the first interference signal is detected. Even if there is no design information about the hole depth, the hole depth can be measured by moving the focal point of the measurement beam by a predetermined pitch, performing fringe scanning; and repeating the movement of the measurement beam and fringe scanning until an interference signal having a correlation to the first interference signal obtained by fringe scanning on the sample surface is detected.

According to another preferred embodiment of the depth measurement method in accordance with the present invention, the light detecting means uses light detecting means having a charge storage effect where an amount of charges accumulated by receiving incident light corresponds to the receiving time; and an integration time (charge storage time) of the line sensor or the light detecting means when the second interference signal is detected is set to be longer than an integration time when the first interference signal is detected. The problem in that the reflected light from the bottom surface of the recessed portion is weak can be solved by using the charge storage effect of the line sensor or the like. It should be noted that as a method for providing a longer integration time, the fringe scanning speed may be controlled.

According to the present invention, the amount of displacement at the peak of the cross correlation function between an interference signal when the focal point of the measurement beam is positioned on the sample surface and an interference signal when the focal point of the measurement beam is positioned near the bottom surface of the recessed portion is calculated. Therefore, even if the reflected light from the bottom surface of the recessed portion is weak, the real depth of the recessed portion can be measured. As a result, the depth of a fine hole such as a via hole having a high aspect ratio can be measured with a high resolution.

In addition, the depth measurement apparatus in accordance with the present invention can output 2-dimensional image information of the sample as well as recessed portion depth information using a single confocal optical system. As a result, a via hole, an irregular portion, and the like subject to depth measurement can be detected, and the depth thereof can be measured without removing the sample from the stage.

Further, in the depth measurement mode, a complete confocal optical system is configured and the amount of displacement at the peak of the cross correlation function of the two interference signal is calculated. Therefore, even if the reflected light from the bottom surface of the recessed portion is weak, the depth thereof can be measured accurately.

DETAILED DESCRIPTION OF THE PREFERRED EMBODIMENTS

Figure 1:
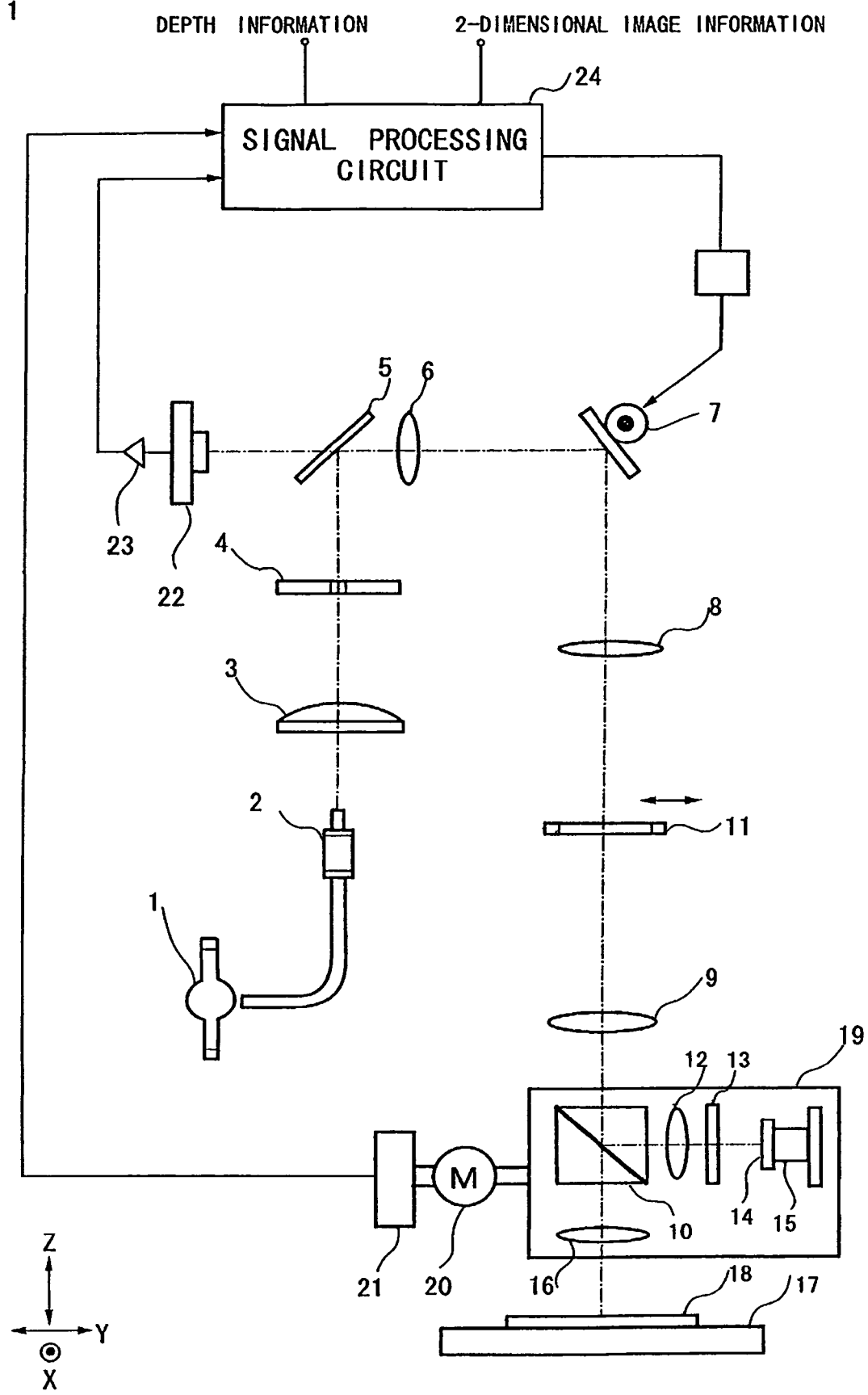
FIG. 1 is a diagram showing an example of the depth measurement apparatus in accordance with the present invention.

FIG. 1 is a diagram showing an example of the depth measurement apparatus in accordance with the present invention. The depth measurement apparatus according to the present embodiment operates in two modes: an observation mode for scanning a sample surface 2-dimensionally and observing the sample surface and a depth measurement mode for measuring the depth of a hole, step, and the like. In the observation mode, 2-dimensional image information of the sample is obtained and displayed on the monitor. Therefore, the operator can observe the sample surface by the 2-dimensional image displayed on the monitor and the recessed portion subject to depth measurement and its address can be detected. In the depth measurement mode, the sample stage is moved in the X and Y directions based on the address information of the recessed portion detected in the observation mode, the recessed portion to be measured is positioned in the measurement position, and depth measurement is performed.

A white light source emitting white light is used as an illumination light source 1. As the white light source, for example, a xenon lamp, a halogen lamp, a mercury lamp, an LED, a white laser, or the like can be used. The illumination light emitted from the illumination light source 1 passes through an optical fiber bundle 2 and is made incident upon a slit 4 disposed in a pupil of a focusing lens 3. The slit 4 has an elongate opening portion extending in a first direction (a direction perpendicular to the surface of the drawings=X direction). The slit 4 projects a line shaped illumination beam or a rectilinear illumination beam, which is reflected by a half mirror (beam splitter) 5 and passes through a relay lens 6 and strikes a vibrating mirror 7. The vibrating mirror 7 periodically deflects the incoming line shaped illumination beam in a direction perpendicular to its extending direction (Y direction) with a predetermined frequency. It should be noted that in the depth measurement mode, the vibrating mirror remains stationary in the center.

The illumination beam emitted from the vibrating mirror 7 passes through relay lenses 8 and 9 and strikes a beam splitter 10. A first image plane of the focusing lens 3 is formed between the two relay lenses 8 and 9, and a second slit 11 is detachably disposed on the first image plane. The second slit 11 has an elongate opening portion extending along the direction perpendicular to the first direction (Y direction). The second slit is selectively inserted in the optical path in the depth measurement mode, and is removed from the optical path in the observation mode.

The beam splitter 10 divides a line shaped illumination beam into a measurement beam and a reference beam. The reflected light emitted from the beam splitter 10 passes through a lens 12 and a shutter 13 and strikes a fringe scanning mechanism as the reference beam. The shutter 13 is closed in the observation mode and is opened in the depth measurement mode, allowing the reference beam to strike the reference mirror. The fringe scanning mechanism has a reference mirror 14 and a piezo element 15 for moving the reference mirror 14 in the optical axis direction at the constant speed. Fringe scanning is performed by the constant movement of the reference mirror 14. Performing fringe scanning introduces a relative optical path length difference continuously changing between the optical path length of the measurement beam and the optical path length of the reference beam. The present embodiment has control means for controlling the movement speed of the reference mirror 14 and can change the integration time (charge storage time) of the line sensor between the case where the focal point of the measurement beam is positioned on the sample surface and the case where the focal point of the measurement beam is positioned near the bottom surface of the recessed portion. In other words, the charge storage effect of the line sensor can be used by controlling the electronic shutter so that the integration time is longer when the focusing point of the measurement beam is positioned near the bottom surface of the recess.

The transmitted light emitted from the beam splitter 10 strikes the objective lens 16 as the measurement beam. The measurement beam is focused by the objective lens 16 and goes into a sample 18 placed on a sample stage 17. The sample stage 17 is configured as an X Y stage. A desired recess formed on the surface of the sample can be observed by drive-controlling the sample stage in X and Y directions, and a desired hole can be positioned in the middle of the visual field.

According to the embodiment, the beam splitter 10, the objective lens 16, and the fringe scanning mechanism having the reference mirror 14 and the piezo element 15 are integrally supported onto a Z stage 19. The Z stage 19 is coupled to a servomotor 20, which moves the Z stage along the optical axis of the objective lens. The servomotor 20 is provided with an encoder 21, which detects the position of the Z stage along the optical axis direction of the objective. As the Z stage 19 moves along the optical axis direction, the focusing point of the measurement beam is also displaced in the optical axis direction. For that reason, by moving the Z stage 19 along the optical axis direction of the objective lens, the relative distance between the focusing point of the measurement beam and the sample changes. Accordingly, by moving the Z stage, the operator can position the focusing point of the measurement beam on the sample surface or near the bottom surface of the recessed portion.

The light beam emitted from the objective lens 16 acts as a rectilinear illumination beam for observing the sample surface in the observation mode, and acts as a spot shaped illumination beam for measuring the depth of a recessed portion in the depth measurement mode. First, the observation mode will be described. The surface of the sample 18 is scanned 2-dimensionally by the focused line shaped illumination beam. The reflected light from the sample surface is collected by the objective lens 16 and is transmitted to the beam splitter 10. Then, the reflected light passes through the two relay lenses 8 and 9 and strikes the vibrating mirror 7. Then, the light is descanned by the vibrating mirror, passes through the lens 6 acting as an imaging lens, transmitted to the half mirror 5, and is made incident upon the line sensor 22. The line sensor 22 has a plurality of light receiving elements arranged in a direction (X direction) corresponding to the extending direction of the line shaped illumination beam. The electric charges stored in the individual light receiving elements are periodically read by a predetermined read frequency. The read signal is amplified by an amplifier 23 and supplied to a signal processing circuit 24. The signal processing circuit performs a signal processing on the input signal and outputs a video signal. Therefore, when the video signal is supplied to the monitor, a 2-dimensional image of the sample 18 is displayed on the monitor. Accordingly, the operator can search for the recessed portion while observing the 2-dimensional image of the sample displayed on the monitor, and can determine whether or not the found recessed portion is to be measured. It should be noted that the address of the recessed portion is outputted based on the position information of the light receiving element of the line sensor and the angular information of the vibrating mirror.

In the depth measurement mode, the second slit 11 is inserted in the optical path. The illumination beam emitted from the white light source 1 passes through the mutually perpendicular two slits 4 and 11 and is converted to a single spot shaped illumination beam having substantially circular cross section. The beam splitter 10 forms the spot shaped measurement beam and the reference beam. The measurement beam strikes the sample 18 and the reference beam strikes the reference mirror 14. The reflected light from the sample surface and the bottom surface of the recess is collected by the objective lens 16 and goes into the beam splitter 10. In addition, the reference beam reflected by the reference mirror 14 also strikes the beam splitter. The beam splitter 10 also serves as beam combining means for combining the reflected light from the sample and the reflected light from the reference mirror. The beam splitter produces interference light caused by white interference. The interference light passes through the relay lens 9, the second slit 11, and the relay lens 8 and strikes the vibrating mirror 7. The vibrating mirror 7 is made to be stationary in the neutral position. Then, the interference light is reflected by the vibrating mirror and passes through the lens 6 and the half mirror 5 and strikes the line sensor 22 as focusing light. The white interference light coming into the line sensor is made incident upon a single light receiving element or a plurality of adjacent light receiving elements of the line sensor.

The electric charges stored in the light receiving elements of the line sensor are periodically read by a predetermined read rate. Here, the piezo element 15 is used to move the reference mirror 14 at the constant speed, and fringe scanning is performed. By reading the electric charges stored in the light receiving elements by a predetermined sampling frequency, an interference signal (fringe scan signal) generated by white interference between the measurement beam and the reference beam is detected. According to the present embodiment, for example, the reference mirror is moved every 5 nm step and 1024 samples are detected. In addition, the movement speed of the reference mirror can be variably controlled, and the sampling frequency can be set to be variable according to the movement speed of the reference mirror. By such a configuration, when fringe scanning is performed where the focusing point of the measurement beam is positioned near the bottom surface of the recessed portion, the scanning speed is set to be slow and the integration time of the line sensor can be set to be longer.

In addition, if reading the light receiving elements of the line sensor is performed in synchronism with moving the Z stage 17 in the optical axis direction, the relation between the brightness value and the relative distance between the focal point of the measurement beam and the sample surface is outputted. Therefore, according to the characteristics of the confocal optical system (when the focusing point of the measurement beam is positioned on the sample surface, maximum brightness value is detected by light detecting means), by reading out the electric charges stored in the light receiving elements of the line sensor while the Z stage being moved in the Z axis direction, the position in the Z axis direction of the sample surface can be detected.

Figure 2:
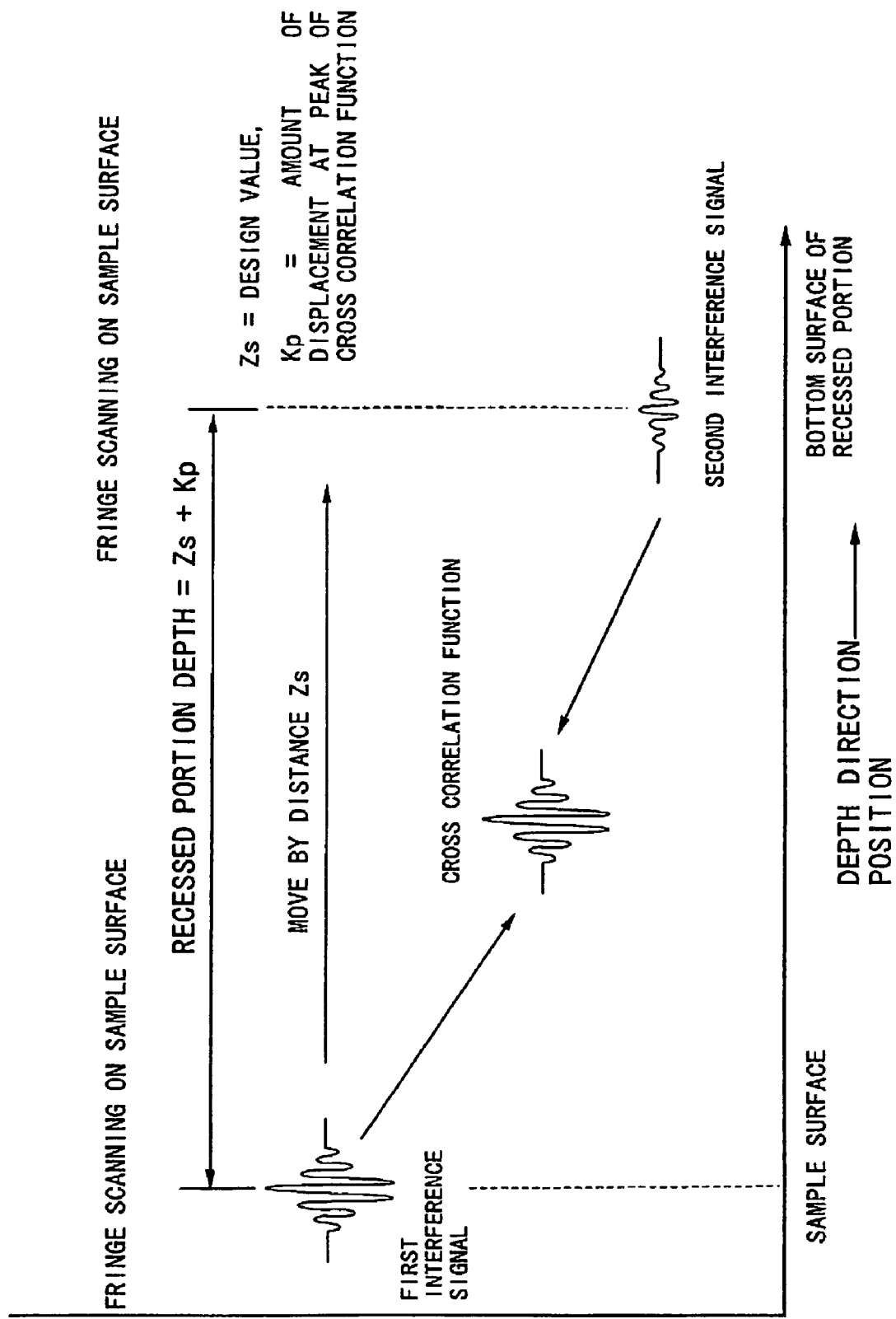
FIG. 2 is an explanatory drawing for explaining the principle of the depth measurement in accordance with the present invention.

Hereinafter, the measurement principle of the depth measurement method in accordance with the invention will be described. FIG. 2 is an explanatory drawing for explaining the depth measurement method in accordance with the invention. The focusing point of the measurement beam is positioned near the recess formed on the sample surface is formed, fringe scanning is performed, and the first interference signal is detected. The interference signal is an interference signal generated by white interference. Next, the focusing point of the measurement beam is positioned and is displaced in the depth direction, for example, by a distance Zs, which is a design value of the depth of the recess. In this state, the focusing point of the measurement beam is positioned near the bottom surface of the recess. In the position, the second fringe scanning is performed and the second interference signal is detected. The second interference signal is also an interference signal generated by white interference. The, the cross correlation function R(k) between the detected two interference signals is obtained. Calculating the amount of displacement Kp at the peak of the cross correlation function produces a distance between the focusing point of the measurement beam and the bottom surface of the recess. Accordingly, the sum of the distance Zs and the amount of displacement Kp at the peak of the cross correlation function is obtained as the real depth of the recess. The expression of the cross correlation function R(k) is shown below.

$$R(k) = \frac{1}{N-k} \sum_{n=0}^{N-1-k} x(n+k) \cdot y(n) \quad \text{(Formula 1)}$$

$$\{k = 0, 1, 2, \ldots, N-1\}$$

Figure 3:
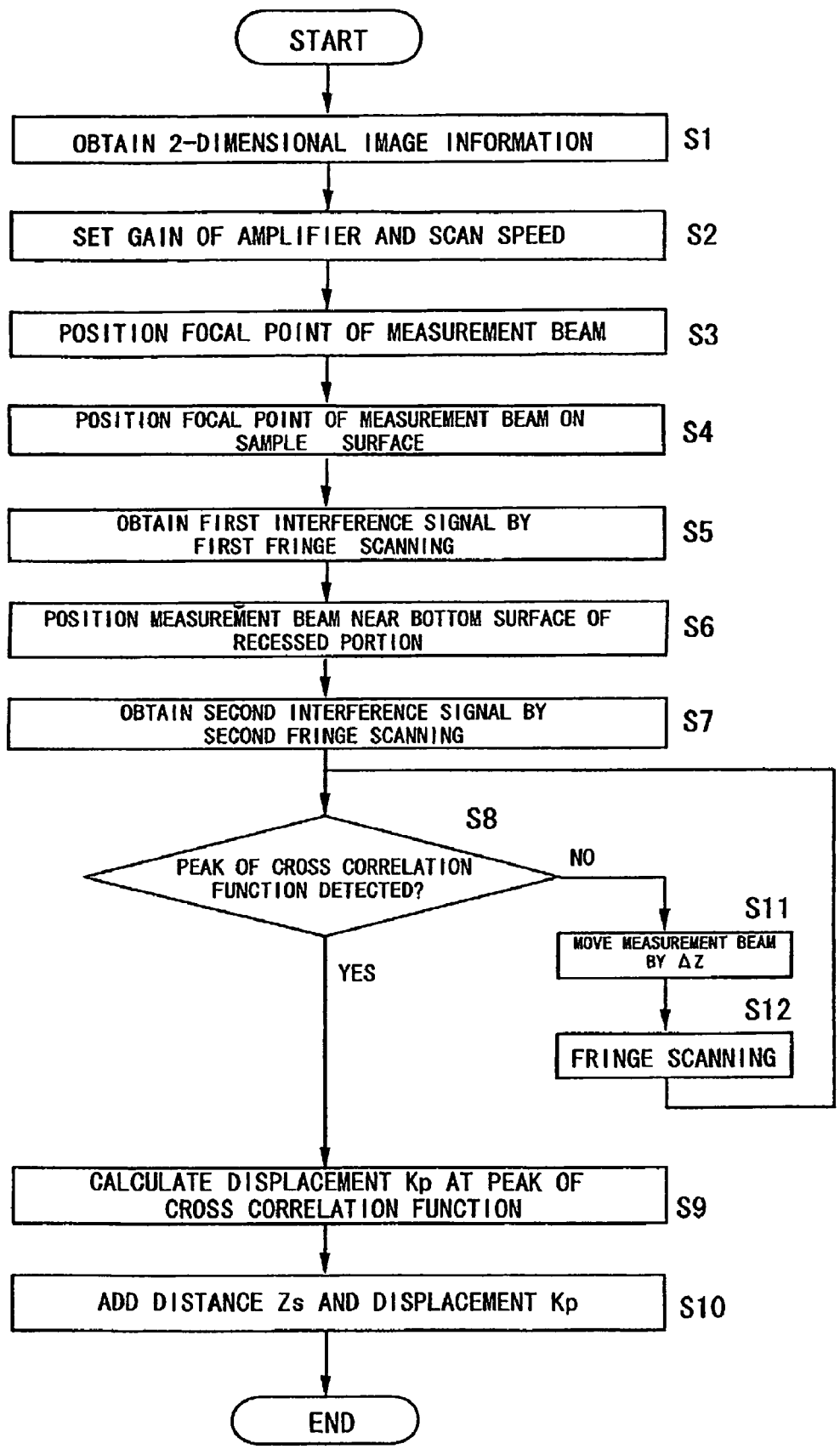
FIG. 3 is flowchart showing a series of steps of the depth measurement apparatus in accordance with the present invention.

Next, with reference to the flowchart shown in FIG. 3, a specific depth measurement method in accordance with the present invention will be described. Before starting the measurement, set the sample observation mode, and obtain the 2-dimensional image information of the sample surface (step 1). The 2-dimensional image is displayed on the monitor, and the recess subject to depth measurement is searched for and determined.

Next, perform the brightness adjustment (step 2). The signal intensity of the second interference signal obtained by fringe scanning which is performed where the measurement beam is positioned near the bottom surface of the recessed portion may be weaker than the signal intensity of the first interference signal obtained by fringe scanning which is performed where the measurement beam is positioned on the sample surface. In that case, a measurement error is caused by a noise component. With that in mind, according to the present embodiment, the signal intensity of the first interference signal outputted when the focusing point of the measurement beam is positioned on the sample surface and the signal intensity of the second interference signal obtained when the focusing point of the measurement beam is positioned near the bottom surface of the recess have been measured in advance. Then, the gain of the amplifier and the fringe scanning speed are set an advance so that signal intensity not affected by the noise component can be obtained. More specifically, the line sensor has the charge storage effect, and the amount of charges stored in the light receiving elements increases according to the light receiving time. In addition, the signal intensity of the interference signal to be detected is the sum of the signal component and the noise component generated by receiving the interference signal. Therefore, setting a longer integration time will increase the signal component generated by the interference signal and reduce the effect of noise.

Next, perform a positioning operation for the focusing point of the measurement beam (step 3). While observing the 2-dimensional image which is obtained in the observation mode and is displayed on the monitor, the operator moves the sample stage 17 so that the recess to be measured may be positioned at the middle of the screen, and confirms the spot shaped light beam and the position of the recess. Then, by slightly moving the sample stage or the vibrating mirror, the operator performs the positioning so that the light beam is positioned near the recessed portion.

Next, perform the positioning so as to position the Z stage at the start position as well as to position the focusing point of the measurement beam on the sample surface (step 4). The positioning operation of the measurement beam can be performed as follows. The operator keeps the shutter 13 in the closed state, moves the Z stage in the optical axis direction, for example, in a direction nearing the sample, to sequentially read the electric charges stored in the light receiving elements of the line sensor and supply it to the signal processing circuit 24. In the meantime, when the focusing point of the measurement beam comes gradually close to the sample surface and is positioned on the sample surface, a maximum brightness value is outputted from the light receiving elements of the line sensor; as the focusing point of the measurement beam goes away from the sample surface, the brightness value outputted from the line sensor is lowered. Therefore, the signal processing circuit 24 sequentially stores a signal outputted from the light receiving elements of the line sensor; and at the same time, an output signal from the encoder 21 for detecting the position of the Z stage is also supplied to the signal processing circuit. Then, the position in the Z axis direction of the Z stage where the maximum brightness value is generated is detected. The detected position in the Z axis direction is stored as a first position information.

Next, the Z stage is positioned in the Z direction where the maximum brightness value is generated. In this state, perform the first fringe scanning by driving the reference mirror and the piezo element (step 5). During this fringe scanning, white interference light is generated according to the phase relation between the reflected light from the sample surface and the reflected light from the reference mirror, and an interference signal (fringe scan signal) is outputted from the light receiving elements of the line sensor. Sampling is performed on the output signal from the line sensor, for example, every 5 nm step (amount of movement of the reference mirror) for 1024 samples. The output interference signal is stored in the memory as data of a first interference signal.

Next, the sample stage or the vibrating mirror is slightly moved to position so that the measurement beam is positioned in the middle of the recessed portion, the measurement beam advances inside the recessed portion, and the focusing point of the measurement beam is positioned near the bottom surface of the recessed portion (step 6). In the present embodiment, it is assumed that the design value Zs of the depth of the recess is known. The servomotor 20 is driven to lower the Z stage by distance Zs. At this position, the focusing point of the measurement beam is positioned near the bottom surface of the recessed portion.

In this state, the second fringe scanning is performed and the second interference signal outputted from the light receiving elements of the line sensor is detected and is stored in the memory (step 7).

Next, the signal processing circuit performs the calculation process on the cross correlation function R(k) between the detected second fringe scan signal and the first fringe scan signal and detects a peak of the cross correlation function (step 8).

If a peak of the cross correlation function is detected, the amount of displacement Kp at the detected peak thereof is calculated (step 9).

Next, the sum of the distance Zs and the amount of displacement Kp is calculated and the result is outputted as the real depth of the recessed portion (step 10).

If no correlation is recognized between the signal obtained by the second fringe scanning and the first interference signal, and if no peak of the cross correlation function is detected, the Z stage is lowered by one step ($\Delta Z$) (step 11), and fringe scanning is performed again (step 12). The operation is repeated until an interference signal is detected. The amount of movement for one step of the Z stage can be set, for example, to ⅓ to ½ of the fringe scanning length.

Hereinafter, the case that the design value of the depth of the recess is unknown will be described. The operation for an unknown design value is the same as that for the known design value, until the focusing point of the measurement beam is positioned on the sample surface, fringe scanning is performed, and the first interference signal is detected. After the first interference signal is detected, the Z stage is lowered by one pitch, and fringe scanning is performed. Then, the correlation between the output signal from the light receiving elements of the line sensor and the first interference signal is calculated and a determination is made to see whether a peak of the cross correlation function is detected. If a peak is detected, the detected output signal is used as the second interference signal to calculate the amount of displacement at the peak of the cross correlation function. Here, the distance for one pitch of the Z stage can be set, for example, to ⅓ to ½ of the fringe scanning length. If no correlation is found, the Z stage is lowered by one pitch, and fringe scanning is performed again. Then, the cross correlation function between the output signal from the light receiving elements of the line sensor and the first interference signal is calculated. When a final interference signal is detected, the sum of the total amounts of displacement which the Z stage has been moved and the amount of displacement at the peak of the cross correlation function is calculated and the result is outputted as the measured depth.

Figure 4:
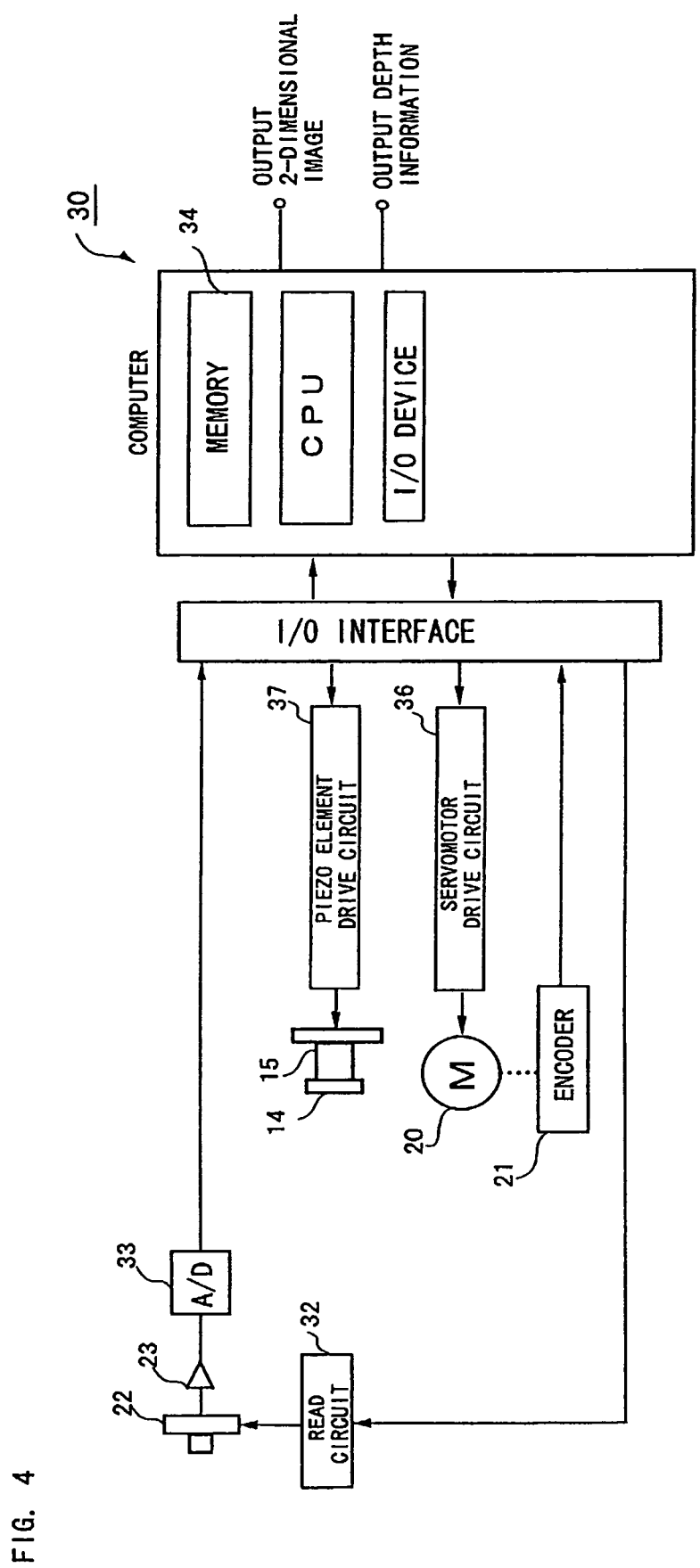
FIG. 4 is a block diagram showing an example of the signal processing circuit of the depth measurement apparatus in accordance with the present invention.

FIG. 4 is a block diagram showing an example of the signal processing circuit of the depth measurement apparatus in accordance with the invention. According to the present embodiment, a computer 30 performs software process to output depth information of the recessed portion. In the sample observation mode and in the depth measurement mode, in response to a control signal from the computer 30, the 2-dimensional image output and the depth information output are performed. First, in the observation mode for observing the sample surface, a read control signal outputted through an I/O interface 31 from the computer 30 is supplied to a read circuit 32, and the electric charges stored in the individual light receiving elements of the line sensor 22 are read by a predetermined read frequency. The read output signal is amplified by a preamplifier 23, is converted to a digital signal by an A/D converter 33, and is stored in a memory 34 of the computer. The computer also receives position information from a pixel counter, i.e., position information of the individual light receiving elements of the line sensor, and an output signal from a vibrating mirror counter, i.e., position information of the vibrating mirror, which are stored as the 2-dimensional image information of the sample surface. When the 2-dimensional image information stored in the memory 34 is supplied to a monitor, the 2-dimensional image information of the sample surface is displayed on the monitor.

In the depth measurement mode, a predetermined operation is performed by a control signal outputted from the computer 30. The computer supplies a drive signal to the piezo element drive circuit 35 to execute fringe scanning. It should be noted that the scan speed for fringe scanning can be freely set. For example, if the reflected light from the bottom surface of the recessed portion has a low intensity, the scan speed can be set to be low so as to provide a long integration time of the line sensor. Further, the computer supplies a servomotor drive circuit 36 with a drive control signal for drive-controlling the servomotor 20 for moving the Z stage in the optical axis direction.

In depth measurement, the computer 30 supplies a control signal to the servomotor drive circuit 36 to move the Z stage in the optical axis direction and execute scanning in the Z axis direction. While scanning in the Z axis direction, an output signal from the line sensor 22 is supplied to the computer. As the Z stage moves in the optical axis direction, the computer compares brightness values sequentially supplied from the line sensor and detects the maximum brightness value. The position in the Z axis direction where the maximum brightness value is generated is detected by the encoder 21 and the position information is stored in the memory.

Next, the computer 30 supplies a control signal to the servomotor drive circuit 36 to move the Z stage at a position where the maximum brightness value is generated. At this time, the focal point of the measurement beam is positioned on the sample surface. In a state where the focal point of the measurement beam is positioned on the sample surface, the computer 30 supplies a control signal to the piezo element drive circuit 35 to execute fringe scanning. The controller 31 supplies a control signal to the read circuit 32 to sequentially sample the electric charges stored in the light receiving elements during the fringe scanning by a predetermined scanning frequency. The sequentially read output signal is A/D converted and is supplied to cross correlation function calculation means 39 as the first interference signal.

Next, the computer 30 supplies a control signal to the servomotor drive circuit 36 to move the Z stage in the optical axis direction by a distance corresponding to the design value, detect the position at this point of time in the optical axis direction of the Z stage by the encoder, and store the output in the memory of the computer. Then, ΔZ calculation means implemented as a program in the computer calculates the amount of displacement Zs of the Z stage based on position information outputted from the encoder.

After the Z stage is displaced by a predetermined distance, the controller supplies a control signal to the piezo element drive circuit 35 to execute the second fringe scanning. When the second fringe scanning is performed, the computer supplies a control signal to the piezo element drive circuit 35 to appropriately set the scan speed for the fringe scanning by considering the signal intensity of the previously measured second interference signal as well as set the read speed of the read circuit 32 accordingly. The second interference signal outputted from the line sensor by the second fringe scanning is supplied to the computer, and the signal waveform of the second interference signal is stored in the memory. The cross correlation function calculation means implemented as a program in the computer performs a calculation process on the first interference signal and the second interference signal, detects a peak of the cross correlation function as well as obtains the amount of displacement Kp at the peak thereof. Addition means implemented as a program adds the obtained amount of displacement Kp to the amount of displacement of Z stage supplied from the AZ calculation means, and the sum is outputted as the depth information of the recessed portion.

The present invention is not limited to the aforementioned embodiments, and various modifications or changes can be made. For example, according to the above embodiment, fringe scanning is performed by driving the reference mirror, but it may be possible to fix the reference mirror and perform fringe scanning by moving the sample stage in the optical axis direction of the objective lens.

What is claimed is:

1. A depth measurement apparatus having a sample observation mode for outputting two-dimensional image information of a sample surface and a depth measurement mode for outputting depth information of a recess formed on the sample surface, the depth measurement apparatus comprising:
   a white light source for generating white illumination light;
   a first slit having an elongate opening portion extending in a first direction, receiving the illumination light and emitting a line shaped illumination beam extending in the first direction;
   a vibrating minor which, in the sample observation mode, deflects the line shaped illumination beam in a direction perpendicular to its extending direction and, in the depth measurement mode, remains stationary;
   a second slit which has an elongate opening portion extending in a direction perpendicular to the first direction and, in the depth measurement mode, is selectively disposed in an optical path;
   an objective lens for focusing the light beam deflected by the vibrating mirror to project it onto the sample surface;
   a line sensor which has a plurality of light receiving elements arranged in a direction corresponding to the first direction and receives reflected light from the sample surface through the objective lens and the vibrating mirror;
   a beam splitter arranged in the optical path between the vibrating minor and the objective lens and for dividing the light beam deflected by the vibrating minor into a measurement beam and a reference beam;
   a reference mirror for reflecting the reference beam to advance it along the optical path;
   fringe scanning means for continuously changing a relative optical path length difference between an optical path length of the measurement beam and an optical path length of the reference beam;
   beam combining means for combining the reflected light from the sample and the reflected light from the reference mirror to form an interference beam;
   a drive mechanism for changing a relative distance between the objective lens and the sample;
   position detecting means for detecting a relative position between the objective lens and the sample; and
   signal processing means which, in the sample observation mode, outputs two-dimensional image information of the sample surface based on an output signal from the line sensor, and, in the depth measurement mode, outputs the depth information of the recess based on displacement information calculated with an interference signal outputted from the line sensor and the relative position information outputted from the position detecting means.

2. The depth measurement apparatus according to claim 1, wherein said signal processing means comprises means for calculating an amount of displacement at a peak of a cross correlation function between a first interference signal detected by performing fringe scanning in a state where a focusing point of the measurement beam is positioned on or near the sample surface near the recess and a second interference signal detected by performing fringe scanning in a state where the focusing point of the measurement beam is positioned on or near a bottom surface of the recess, and wherein the depth of the recess is determined based on the amount of displacement at the peak of the cross correlation function and the relative position information between the objective lens and the sample detected by the position detecting means.

3. The depth measurement apparatus according to claim 2, wherein the line sensor has a charge storage effect in which an amount of charges accumulated by receiving incident light corresponds to the receiving time; said apparatus is provided with means for controlling movement speed of the reference minor; and when the second interference signal is to be detected, the fringe scanning is performed at a speed slower than the fringe scanning speed when the first interference signal is detected so that an integration time of the line sensor is set to be long.

4. The depth measurement apparatus according to claim 1, wherein the beam splitter, the objective lens, and the reference mirror are fixedly disposed on a Z stage; the drive mechanism is configured as a drive mechanism for moving the Z stage in an optical axis direction of the objective lens; and the means for detecting the relative position between the objective lens and the sample is configured as means for detecting the position in an optical axis direction of the Z stage.

5. The depth measurement apparatus according to claim 4, wherein the signal processing means calculates an amount of displacement of the objective lens based on the position information of the Z stage when the first interference signal is outputted and the position information of the Z stage when the second interference signal is outputted; and determines the depth of the recess based on the sum of the obtained displacement amount and the calculated displacement at the peak of the cross correlation function.

6. The depth measurement apparatus according to claim 1, wherein the fringe scanning means comprises the reference mirror and a piezo element for moving the reference mirror along the optical axis; and wherein the fringe scanning is performed by moving the reference mirror along the optical axis.

7. A depth measurement apparatus in which a light beam is projected onto a sample in which a recess is formed, and reflected light from the sample is detected by light detecting means to measure depth of the recess, the depth measurement apparatus comprising:
    means for producing a light beam of white light;
    a beam splitter for dividing the light beam into a measurement beam and a reference beam;
    an objective lens for focusing the measurement beam and projecting it onto the sample;
    a reference mirror for reflecting the reference beam and advancing it along an original optical path;
    fringe scanning means for continuously changing a relative optical path length difference between an optical path length of the measurement beam and an optical path length of the reference beam;
    beam combining means for combining reflected light from the sample and reflected light from the reference minor to produce an interference beam;
    a drive mechanism for changing a relative distance between the objective lens and the sample;
    position detecting means for detecting a relative position between the objective lens and the sample;
    light detecting means for receiving the interference beam and outputting an interference signal; and
    signal processing means for outputting depth information of the recess based on displacement information calculated with the interference signal outputted from the light detecting means and relative position information outputted from the position detecting means,
    wherein said signal processing means comprises means for calculating an amount of displacement at a peak of a cross correlation function between a first interference signal detected by performing fringe scanning in a state where the focusing point of the measurement beam is positioned on or near the sample surface near the recess and a second interference signal detected by performing fringe scanning in a state where the focusing point of the measurement beam is positioned on or near a bottom surface of the recess, and wherein the depth of the recess is determined based on the amount of displacement at the peak of the cross correlation function and the relative position information between the objective lens and the sample detected by the position detecting means.

8. The depth measurement apparatus according to claim 7, wherein the beam splitter, the objective lens, and the reference mirror are fixedly disposed on a Z stage; the drive mechanism is configured as a drive mechanism for moving the Z stage in an optical axis direction of the objective lens; and the means for detecting the relative position between the objective lens and the sample is configured as means for detecting the position in an optical axis direction of the Z stage.

9. The depth measurement apparatus according to claim 8, wherein the signal processing means calculates an amount of displacement of the objective lens based on the position information of the Z stage when the first interference signal is outputted and the position information of the Z stage when the second interference signal is outputted; and determines the depth of the recess based on the sum of the obtained displacement amount and the calculated displacement at the peak of the cross correlation function.

10. The depth measurement apparatus according to claim 7, wherein the fringe scanning means comprises the reference minor and a piezo element for moving the reference minor along the optical axis; and wherein the fringe scanning is performed by moving the reference minor along the optical axis.

11. The depth measurement apparatus according to claim 7, wherein said light detecting means has a charge storage effect in which an amount of charges accumulated by receiving incident light corresponds to the receiving time; wherein said apparatus is provided with means for controlling movement speed of the reference mirror; and wherein when the second interference signal is to be detected, the fringe scanning is performed at a speed slower than the fringe scanning speed when the first interference signal is detected so that an integration time of the light detecting means is set to be long.

* * * * *